United States Patent
Moreno et al.

(10) Patent No.: US 6,954,841 B2
(45) Date of Patent: Oct. 11, 2005

(54) VITERBI DECODING FOR SIMD VECTOR PROCESSORS WITH INDIRECT VECTOR ELEMENT ACCESS

(75) Inventors: Jaime Humberto Moreno, Dobbs Ferry, NY (US); Fredy Daniel Neeser, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 10/243,567

(22) Filed: Sep. 13, 2002

(65) Prior Publication Data

US 2004/0006681 A1 Jan. 8, 2004

Related U.S. Application Data

(63) Continuation-in-part of application No. 10/197,733, filed on Jul. 18, 2002.
(60) Provisional application No. 60/391,778, filed on Jun. 26, 2002.

(51) Int. Cl.[7] ............................................. G06F 17/16
(52) U.S. Cl. ............................. 712/9; 712/22; 712/32; 712/222
(58) Field of Search .............................. 712/9, 22, 32, 712/222, 36; 714/792, 795

(56) References Cited

U.S. PATENT DOCUMENTS 5,669,010 A * 9/1997 Duluk, Jr. .................... 712/22
5,805,875 A * 9/1998 Asanovic .................... 712/222
2003/0014457 A1 * 1/2003 Desai et al. ................. 708/520
2003/0028846 A1 * 2/2003 Garrett ....................... 714/796
2004/0010321 A1 * 1/2004 Morishita et al. ............ 700/2
2004/0073773 A1 * 4/2004 Demjanenko ................. 712/7

* cited by examiner

*Primary Examiner*—Kenneth S. Kim
(74) *Attorney, Agent, or Firm*—Robert M. Trepp; F. Chau & Associates, LLC

(57) ABSTRACT

A configuration of vector units, digital circuitry and associated instructions is disclosed for the parallel processing of multiple Viterbi decoder butterflies on a programmable digital signal processor (DSP) that is based on single-instruction-multiple-data (SIMD) principles and provides indirect access to vector elements. The disclosed configuration uses a processor with two vector units and associated registers, where the vector units are connected back to back for processing Viterbi decoder state metrics. Viterbi add instructions increment vectors of state metrics from a first register, performing a desired permutation of state metrics while reading them indirectly through vector pointers, and writing intermediate result vectors to a second register. Viterbi select instructions perform element-wise maximum or minimum operations on vectors from the second register to determine survivor metrics, performing a desired inverse permutation of survivor metrics while writing them back to the first register and recording the corresponding decisions in a shift register for use in a subsequent traceback operation.

13 Claims, 6 Drawing Sheets

VITERBI DECODING FOR SIMD VECTOR PROCESSORS WITH INDIRECT VECTOR ELEMENT ACCESS

CROSS-REFERENCE TO RELATED APPLICATIONS

The present application is a continuation in part of U.S. patent application Ser. No. 10/197,733, entitled "Digital Signal Processor with SIMD Organization and Flexible Data Manipulation" filed Jul. 18, 2002.

The present application is related to U.S. patent application Ser. No. 09/514,497, entitled "Vector Register File with Arbitrary Vector Addressing" filed Feb. 29, 2000, now issued U.S. Pat. No. 6,665,790, which is incorporated herein by reference.

The present application is related to U.S. Patent application Ser. No. 60/391,778, entitled "Digital Signal Processor with Cascaded SIMD Organization" filed Jun. 26, 2002 which is incorporated herein by reference.

FIELD OF THE INVENTION

The invention is related to digital signal processing and decoding error correcting codes on programmable digital signal processors (DSPs) providing instruction-level parallelism and/or data-level parallelism. More particularly, the invention is related to an efficient Viterbi decoding for rate-1/n binary convolutional codes and rate-k/n binary convolutional codes obtained from rate-1/n binary convolutional codes by puncturing of code bits.

BACKGROUND OF THE INVENTION

The Viterbi algorithm is used for maximum-likelihood sequence decoding of convolutional codes, which are employed for data transmission in many digital communications standards.

It is known in the field of digital communications that Viterbi decoding operations can be visualized by a directed graph known as a trellis, which can be partitioned into several sections or stages, each of which corresponds to a unit of time. A trellis section has J input nodes and J output nodes, where $J=2^m$ denotes the number of states of the underlying convolutional encoder, in which m is the encoder memory in bits, typically an integer between 4 and 9. The state of the convolutional encoder can be defined through equation $$s_t \triangleq 2^{m-1} \cdot b_{t-1} + \ldots + 2^1 \cdot b_{t-m+1} + 2^0 \cdot b_{t-m}, \quad \text{(Equ. 1)}$$

where $b_t$ denotes an input bit of the convolutional encoder.

The Viterbi algorithm essentially comprises three steps. In a first step, branch metrics $\beta(c)$ are computed, for all binary code n-tuples c. A branch metric $\beta(c)$ represents a distance between a received n-tuple of channel outputs and an ideal n-tuple of channel outputs for the given code n-tuple c. The computation of branch metrics is known to those skilled in the art.

In a second step, one implementation of the Viterbi algorithm performs a maximization of a log-likelihood function through a sequence of add-compare-select (ACS) operations, which compute an array of J new state metrics $M_{t+1}(0), M_{t+1}(1), \ldots, M_{t+1}(J-1)$ based on J current state metrics $M_t(0), M_t(1), \ldots, M_t(J-1)$ and the set of previously computed branch metrics. The ACS operations can be expressed by the equation $$M_{t+1}(s_{t+1}) = \max[M_t(s'_t) + \beta(G(s'_t, s_{t+1})), M_t(s''_t) + \beta(G(s''_t, s_{t+1}))] \quad \text{(Equ. 2)}$$

where $s'_t$ and $s''_t$ are those states at time t which are connected through trellis branches with state $s_{t+1}$ at time t+1, and where $G(s_t, s_{t+1})$ denotes the code n-tuple corresponding to the branch from state $s_t$ to state $s_{t+1}$. For each new state $s_{t+1}$, the maximum operation effectively determines a survivor branch and an associated survivor metric. Moreover, information identifying the survivor branch is recorded during the ACS operations. Generally, the add-compare-select (ACS) operations calculate the best path through the trellis for each state.

In a third step, a traceback operation is performed along survivor branches in the trellis, starting either from the state with maximum metric at a particular instant of time or from state 0, if a zero tail has been used by the transmitter to drive the encoder to state 0. While performing a traceback operation, a most likely path through the trellis is identified and decoded data corresponding to the branches on that path are output.

Furthermore, it is known that a trellis section for a rate-1/n binary convolutional code can be decomposed into subgraphs called Viterbi butterflies. The corresponding ACS operations will be referred to as butterfly operations. FIG. 1 shows a Viterbi butterfly, where the nodes on the left and right represent a pair of states at times t and t+1, respectively, and the branches represent the possible state transitions from state pair (2j, 2j+1) to state pair (j, j+J/2). The branches are labeled with code n-tuples c, which are generated by the encoder in corresponding state transitions and which in turn select the appropriate branch metric $\beta(c)$.

Straightforward implementations of ACS operations on programmable DSPs with a data register file whose size is typically limited by instruction encoding constraints require two memory buffers for holding metrics and other state-dependent data, which are used in a ping-pong fashion, for example, in Motorola, Inc., and Agere Systems, "How to Implement a Viterbi Decoder on the StarCore SC140", Application Note ANSC140VIT/D, Jul. 18, 2000. For such Viterbi decoder implementations, all state metrics must be read from a first memory buffer into registers, updated, and written back from registers to a second memory buffer, for every stage of the Viterbi decoder. The frequent memory transfers are expensive in terms of power consumption.

A technique that is based on rotated metric indexing and which avoids the overhead associated with ping-pong memory buffers is described by Marc Biver, Hubert Kaeslin, Carlo Tommasini in "In-place updating of path metrics in Viterbi decoders", IEEE J. of Solid-State Circuits, Vol. 24, No. 4, pp. 1158–1160, August 1989. This technique can be described as follows. Let rotl (j, a, m) (rotr (j, a, m) ) denote the result of rotating the m LSBs of an integer j towards the left (right) by a bits and leaving all other bits of j unchanged and define $$s'_{t+1} \triangleq rotl(s_{t+1}, 1, m) = rotl(2^{m-1} \cdot b_t + 2^{m-2} \cdot b_{t-1} + \quad \text{(Equ. 3)}$$
$$\ldots + 2^0 \cdot b_{t-m+1}, 1, m)$$
$$= 2^{m-1} \cdot b_{t-1} + \ldots + 2^1 \cdot b_{t-m+1} + 2^0 \cdot b_t$$

By relabeling the nodes on the right in FIG. 1 with $s'_{t+1}$, the modified graph in FIG. 2 is obtained. By defining $$M'_{t+1}(s'_{t+1}) \triangleq M_{t+1}(s_{t+1}) \quad \text{(Equ. 4)}$$

it is implied by Biver et al. that the pair of state metrics $(M_t(2j), M_t(2j+1))$ can be replaced by $(M'_{t+1}(2j), M'_{t+1}(2j+1))$ through in-place butterfly operations. After performing these in-place operations, the metric $M'_{t+1}(s'_{t+1})$ is stored at index $s_{t+1} \triangleq rotr(s'_{t+1}, 1, m)$, for $0 \leq s'_{t+1} < J$, which is a permutation of the metric array.

It thus follows from Biver et al. that a section S of the original trellis is equivalent to an in-place trellis section T followed by a permutation R that rotates array indices towards the right by one bit, which is expressed by equation $$S = T \cdot R, \qquad (\text{Equ. 5})$$

and illustrated in FIG. 2. Furthermore, the concatenation of m original trellis sections $S_0 \cdot S_1 \cdot \ldots \cdot S_{m-1}$, where m denotes the encoder memory in bits, is equivalent to the concatenation $(T_0 \cdot R) \cdot (T_1 \cdot R) \cdot \ldots \cdot (T_{m-1} \cdot R)$, where $T_i = T$. Due to the associative law, the latter concatenation is in turn equivalent to the concatenation of in-place trellis sections $\tilde{T}_0 \cdot \tilde{T}_1 \cdot \ldots \cdot \tilde{T}_{m-1}$, where $\tilde{T}_i$ is defined through equation $$\tilde{T}_i \triangleq R^i \cdot T \cdot L^i, \qquad (\text{Equ. 6})$$

in which $R^i$ and $L^i$ denote permutations that rotate array indices by i bits towards the right and left, respectively.

FIG. 3 shows m sections of the trellis for in-place metric updating according to the prior art, for a time instant t that is wholly divisible by the encoder memory m. The structure of the in-place trellis section $\tilde{T}_i$ repeats after every m sections. For in-place metric updating according to FIG. 3, the elements of the array of J metrics are referenced by the column indices $\tilde{s}_t$ in FIG. 3, which are given by equation $$\tilde{s}_t \triangleq \mathrm{rotl}(s_t, \bmod(t, m), m), \qquad (\text{Equ. 7})$$

i.e., the metrics are stored in a permuted order that depends on the current time index t.

Attempts were made in recent programmable DSPs to accelerate Viterbi decoding by instruction-level parallelism and/or data-level parallelism.

FIG. 4 shows an exemplary DSP according to the prior art, which is based on memory-to-register load instructions, register-to-register compute instructions, and register-to-memory store instructions. Generally, an instruction or program instruction is herein contemplated as a sequence of stages comprising instruction fetch, instruction decoding, operand read, execute, and result writeback. Program instructions are decoded by an instruction decoder 2 and executed by either moving data between memory 6 and registers in a data register file 8 or by performing arithmetic/logic operations on the contents of such registers in arithmetic/logic units (ALUs) 10 and saving the results in such registers. The source address of memory-to-register load instructions and the target address of register-to-memory store instructions is usually provided by an address generation unit 4. The DSP in FIG. 4 uses multiple arithmetic/logic units (ALUs) 10 and one common data register file 8.

In order to implement a Viterbi decoder on a programmable DSP as shown in FIG. 4, metric data are typically placed in the data memory 6 and only temporarily moved from/to registers in the data register file 8 for performing ACS operations since the number of metrics, J, typically exceeds the number of available registers in the data register file 8. Those skilled in the art will recognize that repeatedly moving metric data from/to memory incurs a significant power consumption overhead. In general, in-place data processing is a means for reducing the number of memory transfers. However, even if the J metrics fit into the data register file 8 so that each metric corresponds to a register in the data register file 8, the in-place metric updating according to FIG. 3 is not beneficial since different sets of registers correspond to the input/output metrics of a butterfly in each section $\tilde{T}_i$ of the trellis. This implies different and non-uniform program code for each of m trellis sections and therefore a significant growth of program code so that rotated metric indexing cannot be used efficiently on programmable DSPs as shown in FIG. 4.

On programmable, pipelined DSPs, Viterbi ACS operations are advantageously broken up into a set of metric add instructions, followed by a set of metric compare/select instructions. Furthermore, it is desirable to use software pipelining, i.e., metric add instructions that perform operations for one set of butterflies are executed concurrently with metric compare/select instructions that perform operations for another set of butterflies. For a DSP as shown in FIG. 4, such concurrency demands that all source operands of the metric add instruction and the metric compare/select instruction be read simultaneously from the data register file 8. Similarly, all target operands of said instructions must be written simultaneously to the data register file 8. It will be apparent to those skilled in the art that the corresponding large numbers of register file read ports and write ports is costly in terms of chip area and power consumption.

Another approach is disclosed in U.S. Pat. No. 5,987,490, which describes a dual-MAC processor that performs up to two ACS operations every two machine cycles or, equivalently, achieves a performance of 2.0 cycles per Viterbi butterfly. This configuration has the disadvantages arising from the need for a ping-pong buffer in memory, as outlined above.

Yet another approach is used in the StarCore SC140 DSP architecture, which has four functional units and exploits subword parallelism to process two Viterbi butterflies in parallel, achieving a highest performance of 1.25 cycles per Viterbi butterfly as described in Motorola, Inc., and Agere Systems, "How to Implement a Viterbi Decoder on the StarCore SC140", Application Note ANSC140VIT/D, Jul. 18, 2000. This configuration has the disadvantages arising from the need for a ping-pong buffer in memory, as outlined above.

A further disadvantage of these prior-art techniques is that they do not scale for the parallel processing of four or more Viterbi butterflies. A primary reason for this problem is the limited number of data registers available in DSP architectures which do not support indirect access to registers and whose register file size is thus limited by instruction encoding constraints.

From the above it follows that there is still a need in the art for an improved programmable digital signal processing device for implementing a Viterbi algorithm. Moreover, the add-compare-select (ACS) operations should be performed more efficiently in order to reduce the power-consuming memory transfers to a minimum.

SUMMARY OF THE INVENTION

The present invention discloses a configuration for Viterbi decoding on SIMD-based digital signal processor (DSP) architectures, which are employed for vector processing. This configuration extends the DSP architecture with cascaded single-instruction-multiple-data (SIMD) organization and flexible data manipulation as disclosed in U.S. patent application Ser. No. 10/197,733, entitled "Digital Signal Processor with SIMD Organization and Flexible Data Manipulation" filed on Jul. 18, 2002, presently assigned to the assignee of the instant application and the disclosure of which is incorporated herein by reference.

In accordance with a first aspect of the present invention, there is provided a programmable digital signal processing device for implementing a Viterbi algorithm having a plurality of add-compare-select operations operating on a plurality of Viterbi state metrics. The device comprises a first vector unit comprising a plurality of first registers, a second vector unit comprising a plurality of second registers and connected to the first vector unit via a connection, and a vector pointer unit connected to the first vector unit, the vector pointer unit storing and processing pointers for indirectly addressing the plurality of first registers, wherein the first vector unit and the second vector unit perform concurrent operations for executing a subset of the plurality of add-compare-select operations. Additional vector units are possible such as to allow cascaded operations.

The presented configuration allows the processing of multiple Viterbi butterflies in parallel to reduce the processing time in cycles/(Viterbi butterfly), where the number of butterflies processed in parallel is given by the single-instruction-multiple-data (SIMD) vector length.

The connection can be a feedback connection from the second vector unit to the first vector unit for storing Viterbi state metrics computed in the second vector unit to a subset of the plurality of first registers in the first vector unit. The feedback connection from the second vector unit to the first vector unit advantageously allows the implementation of recursive and iterative algorithms such as a Viterbi algorithm, which recursively updates a set of Viterbi state metrics. Moreover, the first and second vector units can be connected back to back and therefore used in tandem for concurrent execution of instructions. Another favorable property, resulting from the use of the two vector units in such a back-to-back configuration, where each vector unit has an associated set of registers, also referred to as register file, is the fact that branch metric additions for a set of Viterbi butterflies can be performed in parallel with survivor metric selections for another set of Viterbi butterflies, in a fully pipelined fashion and without requiring a large number of read ports for each of said register files.

The plurality of second registers can comprise a plurality of vector accumulator registers. Organizing the plurality of second registers as a plurality of vector accumulator registers allows the processing of multiple Viterbi butterflies in parallel, as shown in FIG. 7. For instance, a vector accumulator register may receive a plurality of incremented Viterbi state metrics corresponding to like branches in several Viterbi butterflies.

Each of the vector pointer unit, the first vector unit, and the second vector unit can comprise pluralities of arithmetic/logic units. The arithmetic/logic units of the first vector unit allow performing multiple Viterbi metric additions in parallel and the arithmetic/logic units of the second vector unit allow performing multiple Viterbi metric compare/select operations in parallel, resulting in the ability to perform multiple Viterbi add-compare-select operations in parallel. The arithmetic/logic units of the vector pointer unit allow updating vector pointers for indirectly addressing registers in the first vector unit in parallel with Viterbi add-compare-select operations.

At least one of the arithmetic/logic units of the vector pointer unit can comprise a carry-wrap adder for generating a sequence of bit-wise rotated addresses. Such a carry-wrap adder can be used to directly generate a sequence of bit-wise rotated pointers or addresses, where the rotate amount remains the same for said sequence. This approach avoids to first generate a primary sequence of pointers or addresses, from which the desired sequence of pointers or addresses is generated by rotating each element of the primary sequence by the same amount. The carry-wrap adder is useful as an auto-update adder for efficient rotated metric indexing or addressing in Viterbi decoding. It also can be used in an address generation unit of a conventional DSP architecture.

A shift register can be used in the programmable digital signal processing device for collecting a plurality of bit decisions corresponding to Viterbi state metric selection operations through bit insertion operations and a shift operation (vmshl). The shift register and associated circuitry allows the recording of bit decisions corresponding to Viterbi metric selections upon execution of a Viterbi select instruction (vitsel) and the collection of multiple sets of such bit decisions through execution of the shift operation (vmshl) for use in a subsequent Viterbi traceback operation.

In accordance with a second aspect of the present invention, there is provided a method of performing a first compute-and-move instruction (vitadd) comprising performing a first vector operation on source operands from a first vector unit and placing the results of the first vector operation into a second vector unit. The results can be directly written during the writeback stage into the second vector unit.

By combining compute and move operations, results of an instruction executing in the first vector unit are transferred directly from the first vector unit to the second vector unit, as opposed to prior art techniques that require an extra transfer instruction. Therefore, the combination to the compute-and-move instruction avoids intermediate write/read operations to/from the first registers in the first vector unit, which reduces the number of write/read ports of the register file and allows a more compact program code representation, e.g., for processors based on the very long instruction word (VLIW) principle.

In accordance with a third aspect of the present invention, there is provided a method for operating a first vector unit and a second vector unit in tandem, the method comprising performing the first compute-and-move instruction (vitadd) by performing the first vector operation on source operands from the first vector unit and placing the results of the first vector operation into the second vector unit and concurrently performing a second compute-and-move instruction (vitsel-vitmax/vitmin) in the second vector unit for computing a second vector operation on source operands from the second vector unit and placing the results of the second vector operation via a feedback connection into the first vector unit.

In general, by using several compute-and-move instructions associated with several vector units, the several vector units can be operated in tandem or in cascade, whereby results of an instruction executing in a particular vector unit are transferred to the next vector unit in sequence, avoiding the need for extra transfer instructions. This reduces the number of write/read ports of the register files in the vector units and leads to more compact program code. Moreover, using a feedback connection between vector units allows the implementation of recursive and iterative algorithms such as the Viterbi algorithm.

In accordance with a fourth aspect of the present invention, there is provided a method for implementing in a programmable digital signal processing device a Viterbi algorithm comprising a plurality of add-compare-select operations operating on a plurality of Viterbi state metrics, the method comprising the step of performing in a first vector unit and a second vector unit concurrent operations for executing a subset of the plurality of add-compare-select operations.

Through indirect and concurrent access to a set of vector elements, the disclosed configuration allows efficient implementations of Viterbi decoders using rotated metric indexing and in-place, in-register metric updating on programmable DSPs. Due to the high number of registers for vector elements and the savings resulting from in-place metric updating, the present invention allows keeping all Viterbi state metrics in registers while processing a frame of data, thereby eliminating power-consuming transfers of metric data from/to memory. For example, embodiments of the present invention with at least 260 vector elements allow in-place, in-register metric updating for Viterbi decoders with up to 256 states.

A further advantage of the configuration is that the number of Viterbi butterflies processed in parallel is directly given by a single-instruction-multiple-data (SIMD) vector length, which is a power of 2 such as 2, 4, or 8.

Partitioning a set of add-compare-select operations into a set of first operations executing in the first vector unit and a set of second operations executing in the second vector unit allows overlapping the first operations associated with one set of add-compare-select operations with the second operations of another set of add-compare-select operations in a pipelined fashion to provide high performance on programmable digital signal processors with deep pipelines.

The first vector operation in the first vector unit can be performed by the first compute-and-move instruction (vitadd) comprising the steps of executing a permutation of Viterbi state metrics through an indirect vector read operation from a plurality of first registers of the first vector unit under control of a vector pointer, adding Viterbi branch metrics to Viterbi state metrics, and moving the results to a vector accumulator register in the second vector unit.

The second vector operation in the second vector unit can be performed by the second compute-and-move instruction (vitsel-vitmax/vitmin) comprising the steps of executing an element-wise selection (maximum/minimum) of Viterbi survivor metrics from vectors of incremented Viterbi state metrics in a plurality of vector accumulator registers of the second vector unit, obtaining bit decisions corresponding to the element-wise selection of Viterbi survivor metrics, and executing an inverse permutation of the Viterbi survivor metrics through an indirect vector write operation under control of a vector pointer, wherein the Viterbi survivor metrics are moved to a plurality of first registers of the first vector unit via a feedback connection.

As mentioned above it is possible to perform a permutation of Viterbi state metrics as part of a single program instruction through an indirect vector read operation under control of the vector pointer and performing the inverse of said permutation as part of a second program instruction through an indirect vector write operation under control of the vector pointer. These means for indirect and concurrent read/write access to a set of vector elements are combined with rotated metric indexing to allow efficient in-place metric updating on programmable DSPs, avoiding the overhead of ping-pong buffers employed on other programmable DSPs. All Viterbi metrics can be kept in registers during a frame of data, minimizing power-consuming memory transfers.

Partitioning add-compare-select operations into simpler first vector operations for adding metrics (vitadd) and second vector operations for comparing/selecting metrics (vitsel) with on-the-fly permutation of metrics allows vectorized in-place Viterbi metric updating on programmable digital signal processors with easily implementable component operations.

The bit decisions corresponding to the element-wise selection of Viterbi survivor metrics can be recorded in a shift register for a subsequent Viterbi traceback operation (vmshl). For efficiency, the recording of the bit decisions may be implemented directly by the instruction performing the Viterbi metric selection (vitsel).

Through carry-wrap addition a sequence of bit-wise rotated pointers can be generated. Carry-wrap addition of a bitwise-rotated pointer (p) and an offset (q) can be performed to obtain an updated bitwise-rotated pointer (S) by wrapping around a carry-output from a output-bit of an enhanced adder selectable by a first index (m) to the carry-input of the enhanced adder's least significant bit and by suppressing carry propagation in a position selectable by a second index (a), which can be identified, for example, by the contents of a register corresponding to the rotate amount of a current trellis stage. The sequence of rotated vector pointers used for indirectly accessing Viterbi state metrics by the Viterbi add instruction (vitadd), i.e. the first compute-and-move instruction, and the Viterbi select instruction (vitsel), i.e. the second compute-and-move instruction, may be generated directly through vector pointer auto-update operations using carry-wrap addition, which avoids the need for extra program instructions to obtain the sequence of rotated vector pointers. The carry-wrap adder is useful as an auto-update adder for efficient rotated metric indexing or addressing in Viterbi decoding.

BRIEF DESCRIPTION OF THE DRAWINGS

Preferred embodiments of the invention are described in detail below, by way of example only, with reference to the following schematic drawings.

The drawings are provided for illustrative purpose only and do not necessarily represent practical examples of the present invention to scale.

DETAILED DESCRIPTION OF PREFERRED EMBODIMENTS

Figure 1:
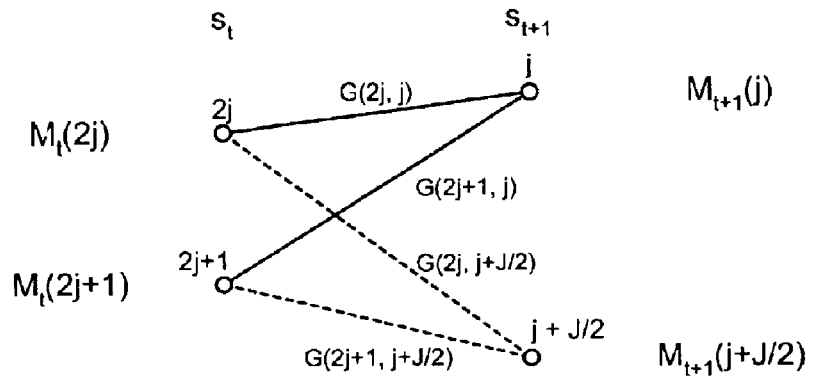
FIG. 1 shows a Viterbi butterfly with the current and new state metrics that are associated with the nodes on the left and right, respectively.
Figure 2:
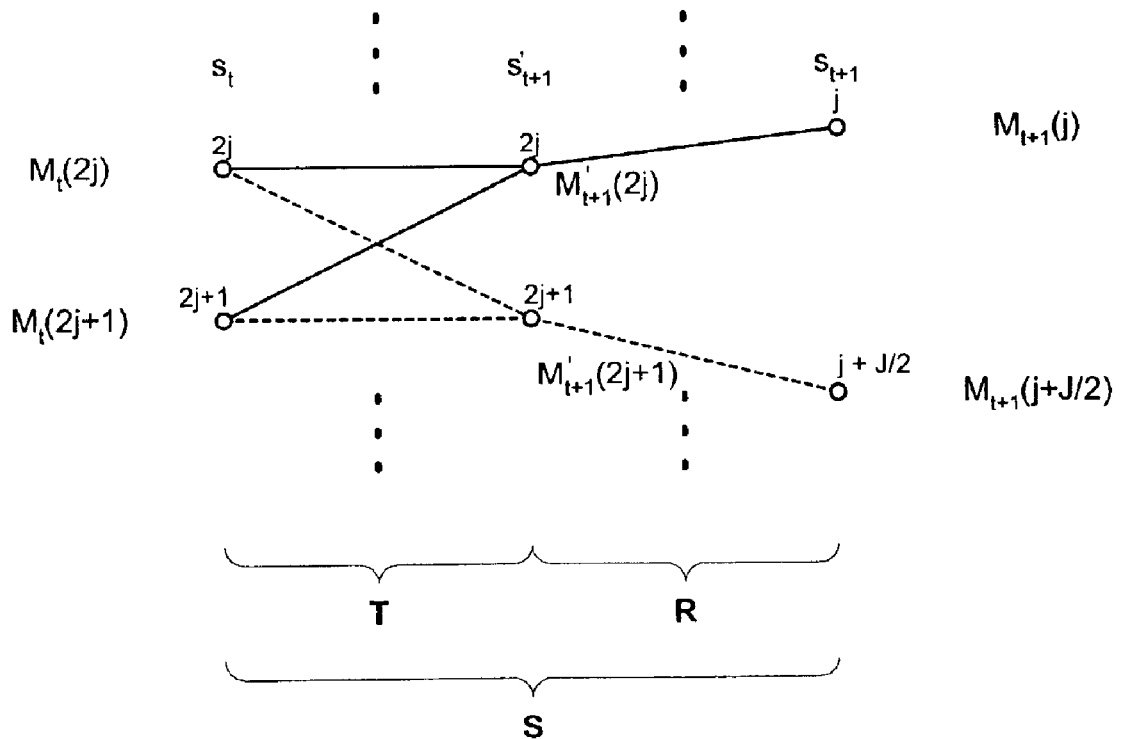
FIG. 2 illustrates the decomposition according to prior art of an original trellis section S into an in-place trellis section T and a permutation R that rotates array indices towards the right by one bit.
Figure 3:
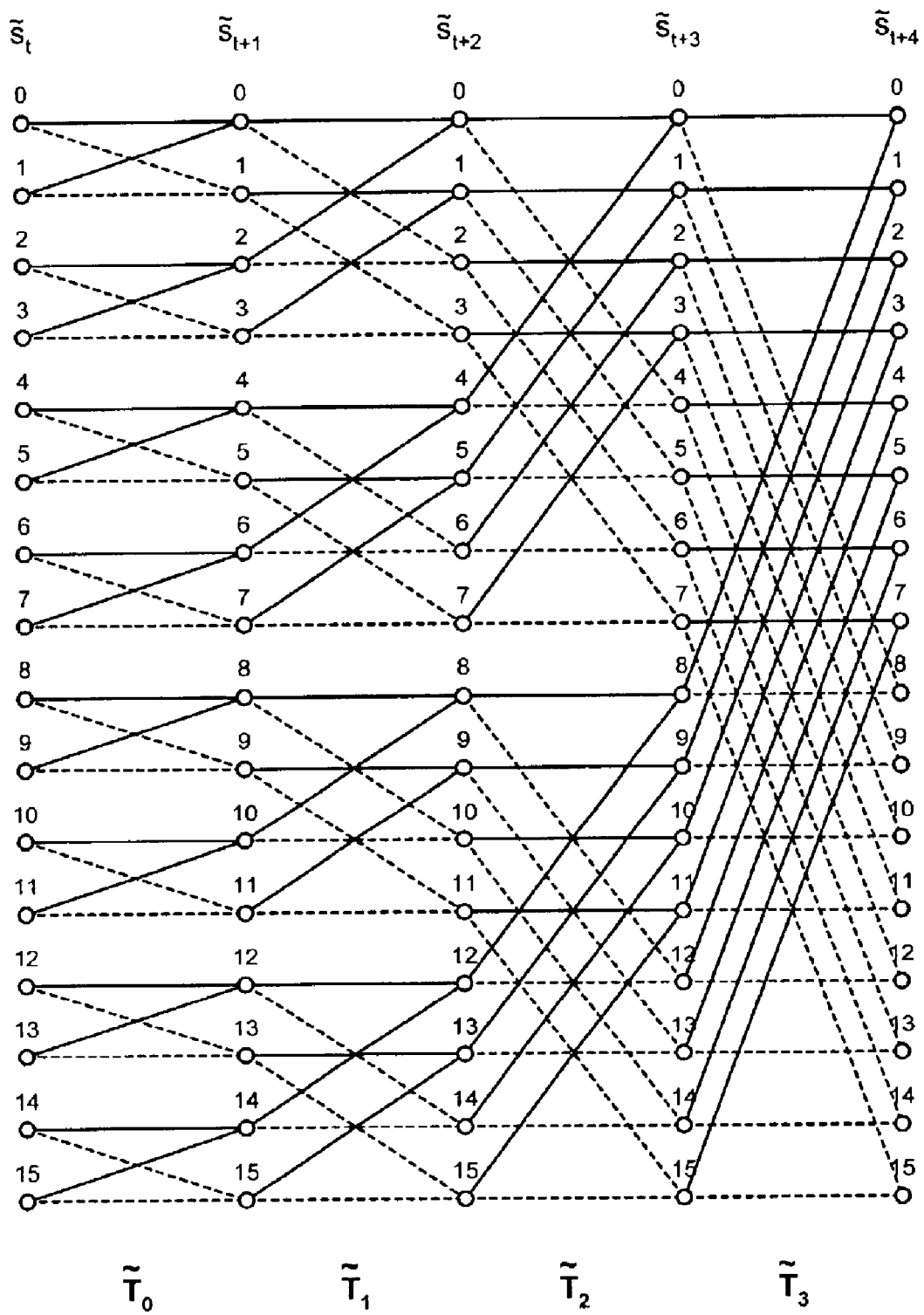
FIG. 3 shows a trellis for in-place metric updating according to prior art, for a Viterbi decoder with J=16 states.
Figure 4:
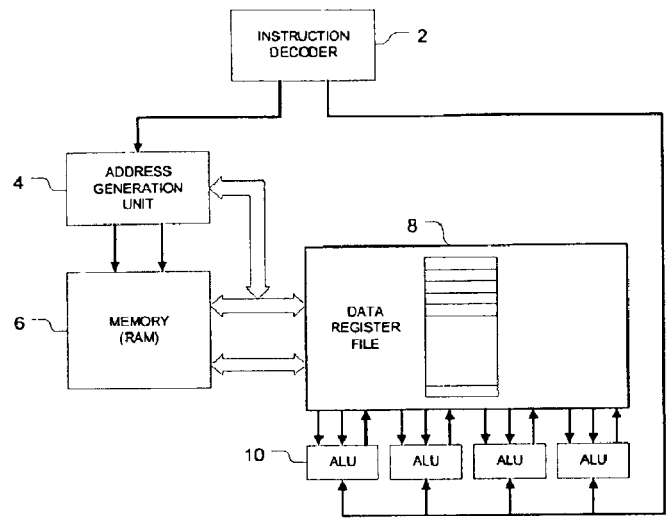
FIG. 4 shows a DSP architecture according to prior art, which uses multiple functional units and one common data register file to allow multiple concurrent operations on data.
Figure 5:
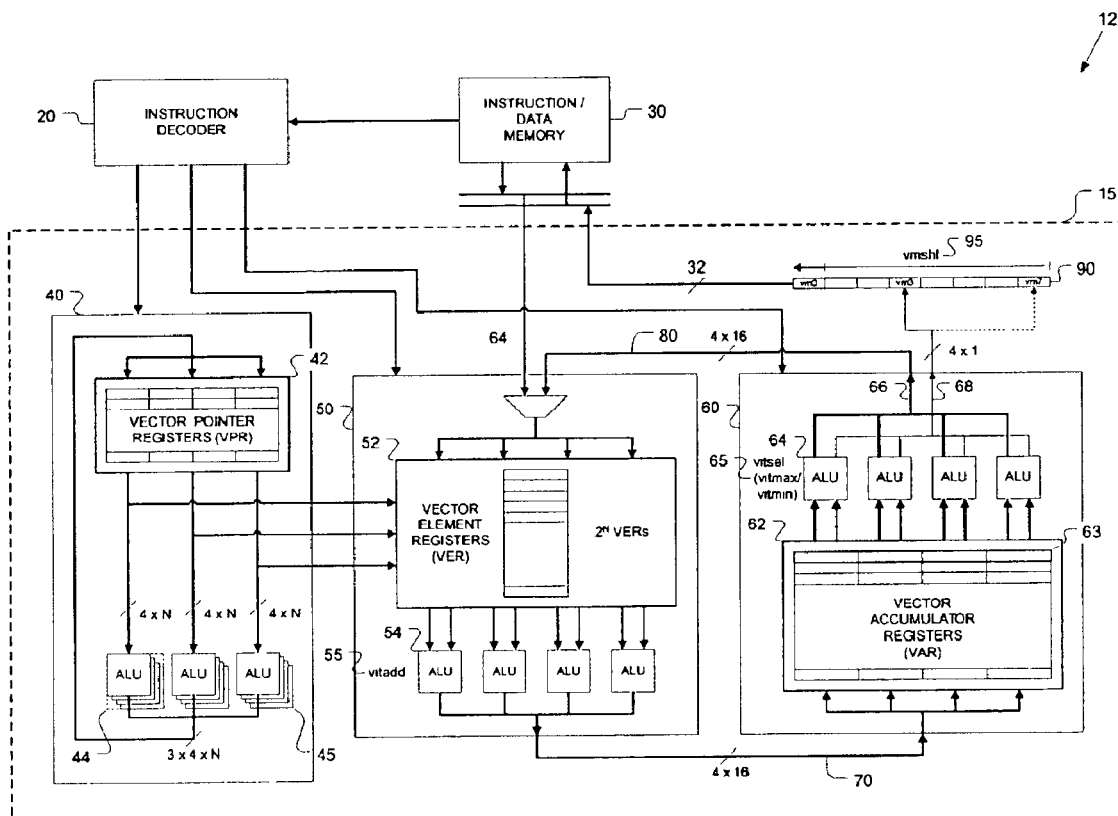
FIG. 5 is a block diagram of a configuration for Viterbi decoding according to the present invention. The configuration comprises a processor with two vector units connected back to back and a vector pointer unit, where each vector unit has dedicated registers and the vector write and read accesses to the vector element registers are performed indirectly through vector pointer registers from the vector pointer unit. In addition, the configuration comprises digital circuitry for recording Viterbi traceback information and instructions optimized for Viterbi decoding.

In FIG. 5 a schematic block diagram of a configuration for Viterbi decoding according to the present invention is shown. FIG. 5 indicates the relevant parts of a digital signal processing device 12, also referred to as DSP processor 12, for Viterbi decoding. The DSP processor 12 comprises an instruction decoder 20, an instruction/data memory 30 such as SRAM or DRAM, and a vector processing unit 15. The vector processing unit 15 comprises a vector pointer unit 40 for indirect vector access, a first vector unit 50 that is also referred to as vector element unit 50, and a second vector unit 60 that is also referred to as vector accumulator unit 60. Further, the vector processing unit 15 comprises a feedback connection 80 for updating Viterbi metrics, digital circuitry 68 and a shift register 90 for recording Viterbi traceback information and uses instructions 55, 65, and 95 optimized for Viterbi decoding. The instructions are labeled as vitadd 55, vitsel (vitmax/vitmin) 65, and vmshl 95. The vector pointer unit 40, the first vector unit 50, and the second vector unit 60, each comprises pluralities of arithmetic/logic units 45, 54, 64, respectively. At least one of the arithmetic/logic units 45 of the vector pointer unit 40 comprises a carry-wrap adder 45 for generating a sequence of bit-wise rotated addresses as described in more detail below. The vector pointer unit 40 further comprises vector pointer registers 42, also labeled with VPR. The instruction/data memory 30 is connected to the instruction decoder 20, and both have further connections to the vector processing unit 15.

The embodiment shown uses single-instruction-multiple-data (SIMD) vectors of length 4, but it should be understood that configurations with vector lengths other than 4 are in the scope of this invention.

Each of the two vector units, i.e. the vector element unit 50 and the vector accumulator unit 60, has an associated set of registers. In detail, the vector element unit 50 comprises a plurality of first registers 52, also referred to as vector element registers 52 and labeled with VER, and the second vector unit 60 that is connected via the feedback connection 80 to the first vector unit 50 comprises a plurality of second registers 62, also referred to as vector accumulator registers 62 and labeled with VAR. The plurality of second registers 62 comprises here a plurality of vector accumulator registers 63 allowing the processing of multiple Viterbi butterflies in parallel. The two vector units 50, 60 are used for Viterbi decoding in a back-to-back configuration, as follows. The results of instructions executed in the vector element unit 50 on the vector element registers 52 are sent through a forward connection 70 to the second vector unit 60, where they are stored in the vector accumulator registers 62. Similarly, the results of instructions executed in the second vector unit 60 on the vector accumulator registers 62 are sent through the feedback connection 80 to the vector element unit 50, where they are stored in the vector element registers 52.

The vector write and vector read accesses to the vector element registers 52 are performed indirectly under element-wise control of the vector pointer registers 42, where each vector pointer register comprises a vector of arbitrary indices for selecting elements of the vector element registers 52 and parameters for controlling the auto-update behavior of the vector pointer registers indices.

Regarding the block diagram in FIG. 5, it is in the scope of this invention to have a more flexible vector accumulator unit 60 that also supports accumulation for standard DSP convolution operations. Such a unit has buses 70 and 80 for the connection and vector accumulator registers 62 that accommodate more than 16 bits per vector element to achieve an appropriate dynamic range, and provides additional internal feedback paths inside the vector accumulator unit 60 for accumulation.

The present invention combines rotated metric indexing with hardware and software means for indirect and concurrent read/write access to the plurality of first registers 52.

Within the description the same reference numbers are used to denote the same or like parts.

Figure 6:
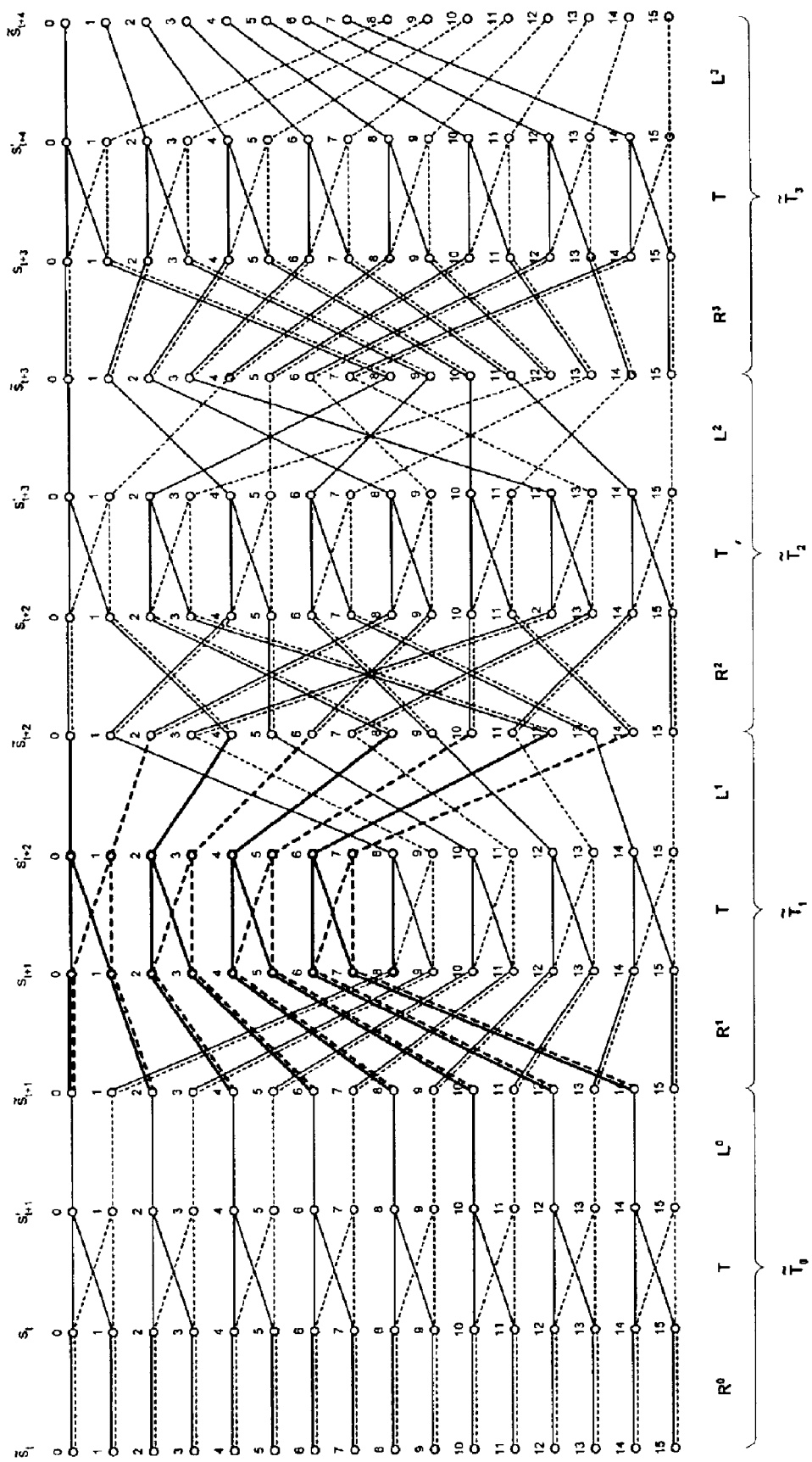
FIG. 6 shows a preferred method for vectorization of the Viterbi algorithm according to the present invention. The embodiment shown is for a Viterbi decoder with J=16 states and for processing a set of 4 Viterbi butterflies in parallel.

FIG. 6 illustrates a vectorization of the Viterbi algorithm in accordance with the present invention. The illustration is for a time instant t that is wholly divisible by encoder memory m, for a Viterbi decoder with $J=2^m=16$ states and for processing a set of 4 Viterbi butterflies in parallel. It will be apparent to those skilled in the art that the present invention can be used for encoder memories m other than 4 and for SIMD vector lengths other than 4. Specifically, FIG. 6 shows m=4 sections $\tilde{T}_i$ of a trellis, where each section is comprised of a rotate-right permutation $R^i$, an in-place subsection T, and a rotate-left permutation $L^i$. The structure of the trellis repeats after every m sections. With reference to Equ. 6, FIG. 5 and FIG. 6, the permutation $R^i$ is achieved in parallel on vector elements from the first registers 52 through an indirect read operation under control of the vector pointer registers 42. Similarly, the inverse permutation $L^i$ is achieved in parallel on vector elements from a result vector 66 through an indirect write operation to the first registers 52 under control of the same vector pointer from vector pointer registers 42.

In a preferred embodiment of this invention and still with reference to FIG. 6, sets of Viterbi butterflies from trellis section T are processed in parallel, where the number of butterflies in each set equals the SIMD vector length of the DSP processor 12. The processing of butterfly sets occurs in natural sequence. For instance, if the SIMD vector length is 4, then the even input/output nodes for the first set of 4 butterflies of T are numbered 0, 2, 4, 6, and the odd input/output nodes for the first set of 4 butterflies are numbered 1, 3, 5, 7. Similarly, the even input/output nodes for the second set of 4 butterflies are numbered 8, 10, 12, 14, and the odd input/output nodes for the second set of 4 butterflies are numbered 9, 11, 13, 15. When accessing input/output nodes of butterflies in T, read/write operations automatically perform the desired permutations through indirect vector access under control of vector pointers. It is an advantage of the present invention that the program code for processing a set of butterflies is always the same, irrespective of the time index t, which results in more compact program code.

Figure 7:
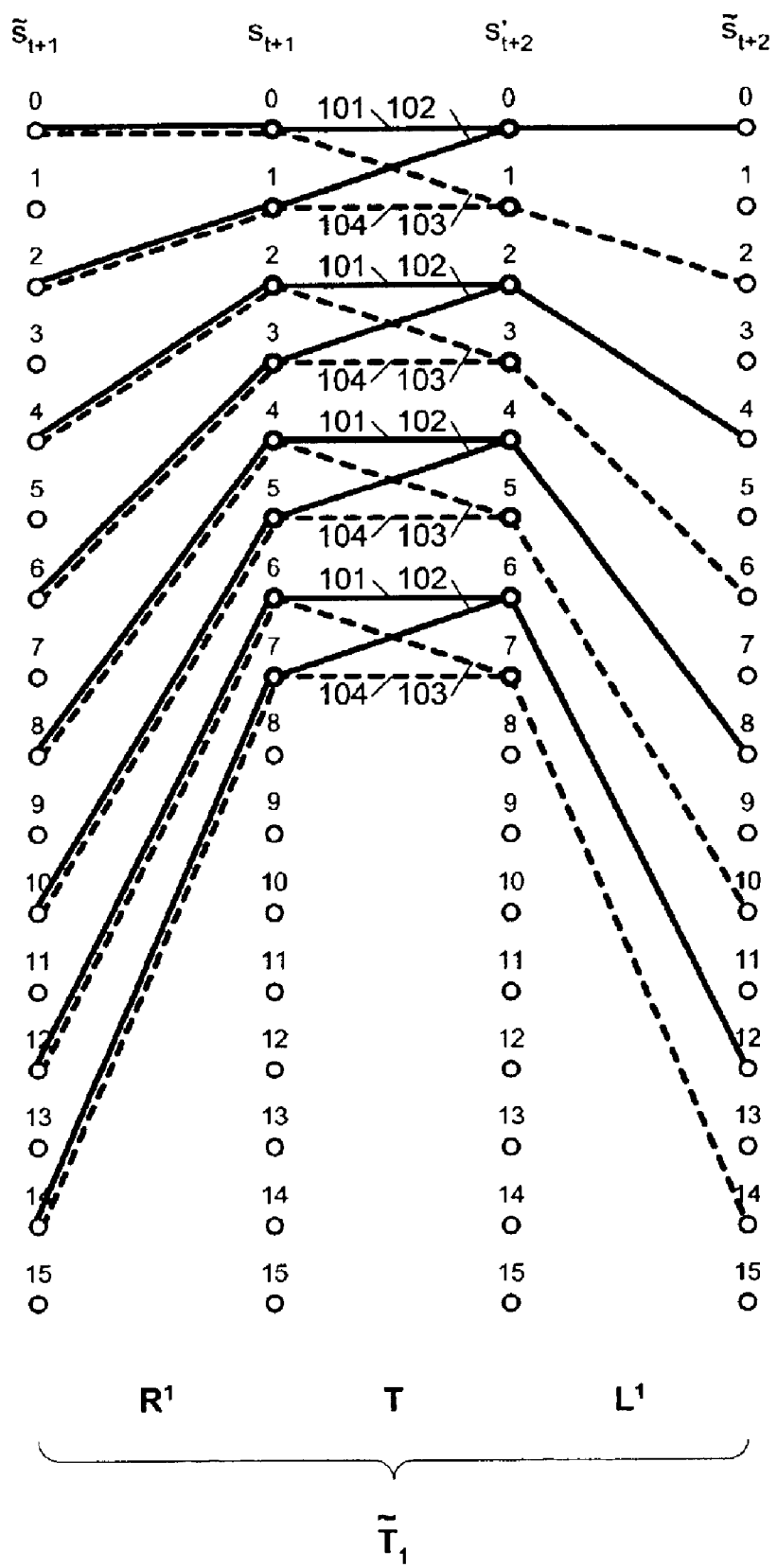
FIG. 7 illustrates the operations performed by the Viterbi decoding instructions according to the present invention, showing an example with parallel processing of 4 Viterbi butterflies.

FIG. 6 highlights the operations associated with a set of 4 Viterbi butterflies in section $\tilde{T}_1$ through branches in boldface type. An enlarged view of this set of branches is provided in FIG. 7. A possible embodiment of these operations through a set of single-instruction-multiple-data (SIMD) instructions is shown in a program code fragment in TABLE 1. The instruction scheduling shown in TABLE 1 represents just one example; those skilled in the art will recognize the need to schedule instructions according to applicable pipeline latencies.

TABLE 1

| . . . | | # Line |
|---|---|---|
| vitadd | va0, (vp0) , (vp10) | # 1 |
| vitadd | va1, (vp1), (vp11) | # 2 |

TABLE 1-continued

| vitadd | va2, (vp0) , (vp11) | # 3 |
| vitadd | va3, (vp1) , (vp10) | # 4 |
| vitmax | (vp0), va0, va1, vm3 | # 5 |
| vitmax | (vp1), va2, va3, vm7 | # 6 |
| ... | | |

The J=16-element state metric array is allocated in the first registers 52 and aligned on a 16-element boundary. The branch metrics are precomputed and also stored in the first registers 52 prior to add-compare-select (ACS) operations using known techniques.

The compute-and-move instruction vitadd VAT, (VPA), (VPB) performs component-wise addition of vectors from the first registers 52 selected indirectly by vector pointers VPA and VPB, respectively, and moves the result to vector accumulator register VAT of the second registers 62. For the example in FIG. 7, the vector pointers that select metrics may initially be given by $$vp0=[0, 4, 8, 12]=rotl([0, 2, 4, 6], 1, 4)$$

$$vp1=[2, 6, 10, 14]=rotl([1, 3, 5, 7], 1, 4)$$

Another valid choice consistent with 16-element alignment would be $$vp0=[16, 20, 24, 28]=rotl([16, 18, 20, 22], 1, 4)$$

$$vp1=[18, 22, 26, 30]=rotl([17, 19, 21, 23], 1, 4)$$

where the metric array starts at vector element 16. The vector pointers vp10 and vp11 are pointing to branch metrics as appropriate for the current set of butterflies.

The instructions on lines 1 and 2 of TABLE 1 perform the metric additions corresponding to the solid branches 101 and 102, respectively, and move the results to va0 and va1. Similarly, the instructions on lines 3 and 4 of TABLE 1 perform the metric additions corresponding to the dashed branches 103 and 104, respectively, and move the results to va2 and va3. Thus, each vitadd instruction performs a permutation of Viterbi state metrics through an indirect vector read operation under control of a vector pointer of the vector pointer unit 40.

The compute-and-move instruction vitmax (VPT), VAA, VAB, VMT selects the component-wise maximum of a first vector accumulator register VAA and a second vector accumulator register VAB in the second registers 62 and moves the result to elements of the first registers 52 selected indirectly by VPT. Moreover, the instruction records a 4-bit indicator in a register identified by VMT, where each of these 4 bits indicates whether the maximum is located in said first or second vector accumulator register. The instruction on line 5 of TABLE 1 performs the compare and select operations corresponding to the solid branches 101 and 102 and moves the resulting survivor metrics to vector elements in the first registers 52 selected by vp0. Similarly, the instruction on line 6 performs the compare and select operations corresponding to the dashed branches 103 and 104 and moves the resulting survivor metrics to vector elements in the first registers 52 selected by vp1. Thus, each vitmax instruction performs an inverse permutation of Viterbi state metrics through an indirect vector write operation under control of the vector pointer unit 40.

Those skilled in the art will recognize that, by reading from and writing to the first registers 52 selected by the same vector pointer vp0 (or vp1), metrics are updated in-place.

With reference to FIG. 5, the instructions vitadd 55 and vitsel (vitmax/vitmin) 65 are associated with the first and second vector units 50 and 60, respectively. An advantage of the configuration in FIG. 5 is the fact that an instruction associated with the first vector unit 50 can be executed concurrently with an instruction associated with the second vector unit 60. One way of providing this capability is to use very long instruction words (VLIWs) containing multiple atomic instructions, which are decoded by the instruction decoder 20. Thus, the present invention allows metric additions for one set of Viterbi butterflies in parallel with survivor metric selections for another set of Viterbi butterflies, in a software-pipelined fashion. The sample code fragment shown in TABLE 2 processes four Viterbi butterflies every four cycles and eight butterflies or 16 states in total, for an average of 1.0 butterflies per cycle.

TABLE 2

| ... | | | |
| vitadd | va0, (vp0), (vp10) | | |
| vitadd | va1, (vp1), (vp11) | | |
| vitadd | va3, (vp1), (vp10) | | |
| vitadd | va2, (vp0), (vp11) | | |
| vitadd | va0, (vp2), (vp12) | \|\| | vitmax (vp0), va0, va1, vm3 |
| vitadd | va1, (vp3), (vp13) | \|\| | |
| vitadd | va3, (vp3), (vp12) | \|\| | vitmax (vp1), va2, va3, vm7 |
| vitadd | va2, (vp2), (vp13) | \|\| | vmshl |
| ... | | \|\| | vitmax (vp2), va0, va1, vm3 |
| | | | ... |
| | | | vitmax (vp3), va2, va3, vm7 |
| | | | vmshl |

The bold and non-bold instructions each represent a basic Viterbi decoder kernel, which processes four Viterbi butterflies in parallel. The vector mask shift instruction vmshl, as illustrated by vmshl 95 in FIG. 5 for an exemplary implementation with eight vector masks, performs a left shift by 4 bits of the contents of the shift register 90, which represents the concatenation of all 4-bit vector masks. The vmshl instruction allows the recording of trace-back information that is generated by vitmax instructions.

With reference to FIG. 6, TABLE 1, and TABLE 2, a further advantage of this invention is the fact that the same vector pointer value can be used to perform read operations in stage $R^i$ for both the solid and dashed branches. Moreover, a vector pointer value used to perform read operations in stage $R^i$ can be reused to perform write operations in stage $L^i$. The significant reuse of vector pointers reduces the number of vector pointer update operations to be performed in the vector pointer unit 40.

If the number of states exceeds 16, then the vector pointers for accessing state metrics (vp0 through vp3 in TABLE 2) should be updated so that they can be reused by subsequent basic Viterbi decoder kernels. The code shown in TABLE 2 will then be repeated after 8 cycles through software pipelining.

For example, suppose that the code fragment in TABLE 2 is instantiated four times, with a scheduling distance of 8 cycles, for a total number of 32 vitadd instructions that process $J=2^m=64$ states, where m=6. For in-place trellis section $\tilde{T}_1$, where the rotate amount is given by a=mod(t, m)=1, the vector pointers are updated according to TABLE 3.

TABLE 3

| | |
|---|---|
| vp0 = rotl ([0, 2, 4, 6], 1, 6) = | [0, 4, 8, 12] |
| vp0 = rotl ([16, 18, 20, 22], 1, 6) = | [32, 36, 40, 44] |
| vp0 = rotl ([32, 34, 36, 38], 1, 6) = | [1, 5, 9, 13] |
| vp0 = rotl ([48, 50, 52, 54], 1, 6) = | [33, 37, 41, 45] |
| vp1 = rotl ([1, 3, 5, 7], 1, 6) = | [2, 6, 10, 14] |
| vp1 = rotl ([17, 19, 21, 23], 1, 6) = | [34, 38, 42, 46] |
| vp1 = rotl ([33, 35, 37, 39], 1, 6) = | [3, 7, 11, 15] |
| vp1 = rotl ([49, 51, 53, 55], 1, 6) = | [35, 39, 43, 47] |
| vp2 = rotl ([8, 10, 12, 14], 1, 6) = | [16, 20, 24, 28] |
| vp2 = rotl ([24, 26, 28, 30], 1, 6) = | [48, 52, 56, 60] |
| vp2 = rotl ([40, 42, 44, 46], 1, 6) = | [17, 21, 25, 29] |
| vp2 = rotl ([56, 58, 60, 62], 1, 6) = | [49, 53, 57, 61] |
| vp3 = rotl ([9, 11, 13, 15], 1, 6) = | [18, 22, 26, 30] |
| vp3 = rotl ([25, 27, 29, 31], 1, 6) = | [50, 54, 58, 62] |
| vp3 = rotl ([41, 43, 45, 47], 1, 6) = | [19, 23, 27, 31] |
| vp3 = rotl ([57, 59, 61, 63], 1, 6) = | [51, 55, 59, 63] |

The first column of TABLE 3 indicates the vector pointer being updated, the second column shows how primary sequences of vector pointers (which are obtained by adding a displacement d=16 when proceeding from row to row, for each group of four rows) are being rotated element-wise by means of operator rotl(., a, m), and the third column shows the resulting secondary sequences of vector pointers. For the example in TABLE 3, the metric array starts at vector element 0. More generally, a metric array may start at any integral multiple of $2^m$ vector elements. The pointer bits other than the m LSBs constitute a base pointer to the metric array and are not modified by the update process.

One method for updating the vector pointers in accordance with the present invention is to generate the above primary sequences of vector pointers by adding a displacement of 16 each time and to obtain the above secondary sequences of vector pointers by additional instructions that perform rotations as shown in TABLE 3 and according to parameters m and a, which are made available through separate registers.

A more advantageous method for updating vector pointers in accordance with the present invention, which does not require primary sequences of vector pointers, is based on the observation that a secondary sequence of vector pointers can be generated directly. Referring to TABLE 3 and given a first index m and a second index a, also referred to as rotate amount $\alpha$ satisfies $0 \leq a < m$, a secondary pointer p (representable with 10 bits, for example) can be updated with a displacement d(d=16, for the example in TABLE 3) through the following sequence of operations $r \leftarrow \text{rotr}(p, a, m)$ (Equ. 8a)

$r \leftarrow r+d$ (Equ. 8b)

$r \leftarrow \text{rotl}(r, a, m)$ (Equ. 8c)

$p \leftarrow p_{9:m} \circ r$ (Equ. 8d)

where operator "$\circ$" denotes concatenation of bit strings.

It will be shown below that the pointer p can equivalently be updated through $q \leftarrow \text{rotl}(d, a, m)$ (Equ. 9a)

$r \leftarrow \text{addcw}(p, q, a, m)$ (Equ. 9b)

$p \leftarrow p_{9:m} \circ r$ (Equ. 9c)

where addcw means addition with carry wraparound. As indicated by Equ. 8d or Equ. 9c, the 10−m MSBs of p are preserved, as they constitute a base pointer to the metric array.

Figure 8:
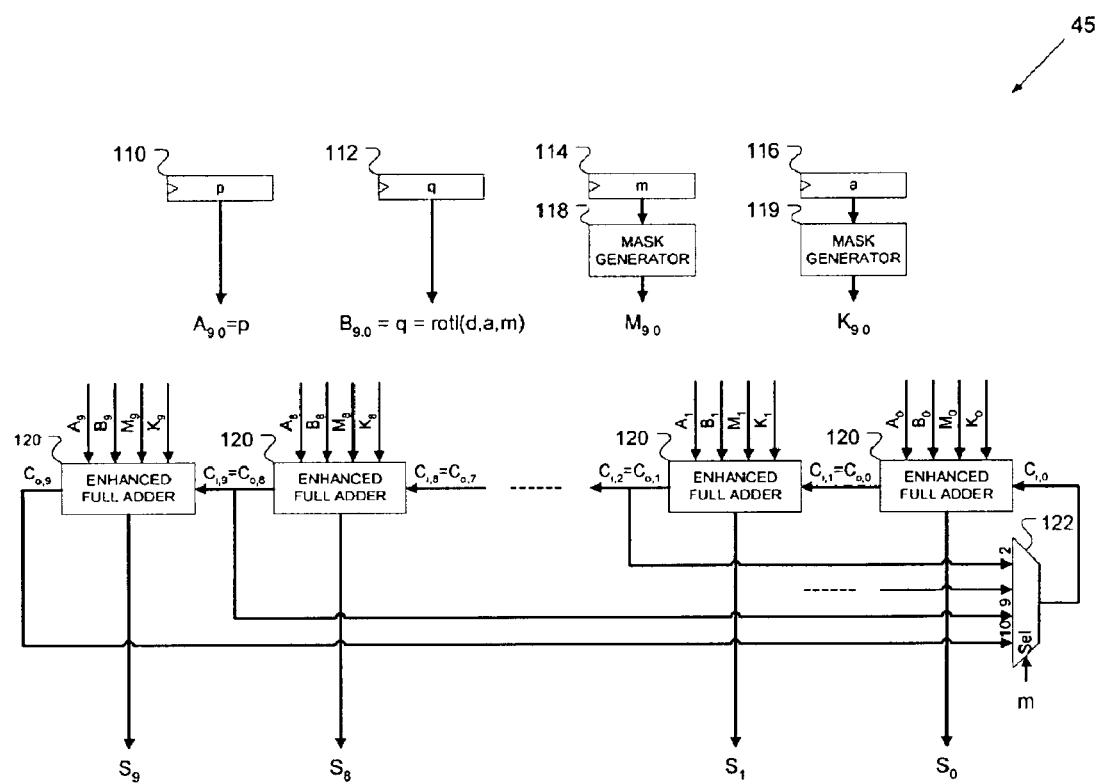
FIG. 8 shows a possible implementation of a binary adder with carry wraparound, also referred to as carry-wrap adder, which can be used to generate a sequence of bit-wise rotated pointers or addresses for Viterbi decoding.

For the example of pointers representable with 10 bits, FIG. 8 shows a carry-wrap adder 45 implementing Equ. 9b and Equ. 9c, which receives inputs p, q, m and a from registers 110, 112, 114, 116, respectively. In the vector pointer registers 42, an additional register 114 is advantageously associated with each of the vector pointer registers 42 for modulo selection in circular addressing and may thus be reused for storing parameter m. Again with reference to FIG. 8, inputs p and q, as well as masks $M=2^m$ and $K=2^a$ generated by mask generators 118 and 119 from parameters m and a, are presented to a cascade of enhanced adders 120, also referred to as enhanced full adders 120. Each enhanced full adder 120 performs the operations of an ordinary full adder and suppresses (i.e., zeroes) the carry input if either mask input is active. The sum outputs $s_{9:0}$ represent the result of the operations in Equ. 9b and Equ. 9c. A multiplexer 122 wraps around the carry output $c_{o,\,m-1}$ to the carry input $c_{1,\,0}$.

Consider the example in TABLE 3, where m=6, a=1, d=16 and q=rotl(d, a, m)=32. For a 10-bit pointer representation, the masks generated by the mask generators 118 and 119 are $M_{9:0}$='0001000000'b and $K_{9:0}$=0000000010"b. It is easily verified and illustrated in TABLE 4 that the pointer sequence (12, 44, 13, 45) in column 3 of TABLE 3, and periodic repetitions thereof, is generated directly by the carry-wrap adder 45 as shown in FIG. 8.

TABLE 4

| |
|---|
| 12 = '0000001100'b |
| addcw (12, 32, a, m) = 44 = '0000101100'b |
| addcw (44, 32, a, m) = 13 = '0000001101'b |
| addcw (13, 32, a, m) = 45 = '0000101101'b |
| addcw (45, 32, a, m) = 12 = '0000001100'b |
| ... |

The third column of TABLE 4 indicates that the pointer bits representing the base index of the array (in bold type) happen to be zero in this example.

Referring now to FIG. 5 and TABLE 2, the vector pointer registers 42 may be auto-updated in accordance with the present invention by letting instruction vitsel (vitmax or vitmin) perform a post-update operation on register VPT according to Equ. 9b and Equ. 9c. The parameter q may be set up for the entire trellis section in a stride register that is associated with VPT. Stride registers may be added to the vector pointer registers 42 and associated one-to-one with the vector pointer registers 42.

It will be apparent to those skilled in the art that addition with carry wraparound as implemented by the exemplary circuit in FIG. 8 may also be used in memory address generation for Viterbi decoding in conventional DSP architectures.

The present invention can be realized through a combination of hardware and software. Any kind of digital signal processor—or other apparatus adapted for carrying out the methods described herein—is suited. A typical combination of hardware and software could be an embedded computer system with a computer program containing a sequence of instructions such as shown in Table 2 that, when being loaded and executed, controls the computer or processor such that it carries out the methods described herein. The present invention can also be embedded in a computer program product, which comprises all the features enabling the implementation of the methods described herein, and which—when loaded in a suitable computer or processor system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

While there has been described and illustrated a programmable digital signal processing device containing a first and second vector unit comprising a plurality of respective registers and a vector pointer unit connected to the first vector unit, it will be apparent to those skilled in the art that modifications and variations are possible without deviating from the broad scope of the invention which shall be limited solely by the scope of the claims appended hereto.

Having thus described our invention, what we claim as new and desire to secure by Letters Patent is:

1. A programmable digital signal processing device for implementing a Viterbi algorithm having a plurality of add-compare-select operations (ACS) operating on a plurality of Viterbi state metrics, the device comprising:
   a first vector unit comprising a plurality of first registers;
   a second vector unit comprising a plurality of second registers and connected to the first vector unit via a connection; and
   a vector pointer unit connected to the first vector unit, the vector pointer unit storing and processing pointers for indirectly addressing the plurality of first registers, wherein the first vector unit and the second vector unit perform concurrent metric addition and survivor metric selection operations, respectively, for executing at least one of the plurality of add-compare-select operations (ACS).

2. Apparatus according to claim 1, wherein the connection comprises a feedback connection from the second vector unit to the first vector unit for storing Viterbi state metrics computed in the second vector unit to at least one of the plurality of first registers in the first vector unit.

3. Apparatus according to claim 1, wherein the plurality of second registers comprises a plurality of vector accumulator registers.

4. Apparatus according to claim 1, wherein each of the vector pointer unit, the first vector unit, and the second vector unit comprises multiple arithmetic/logic units.

5. Apparatus according to claim 4, wherein at least one of the arithmetic/logic units of the vector pointer unit comprises a carry-wrap adder for generating a sequence of bit-wise rotated addresses.

6. Apparatus according to claim 1, further comprising a shift register for collecting a plurality of bit decisions corresponding to Viterbi state metric selection operations through bit insertion operations and a shift operation (vmshl).

7. A method for operating a first vector unit and a second vector unit in tandem, the method comprising performing a first compute-end-move instruction by performing a first vector operation on source operands from the first vector unit and placing the results of the first vector operation into the second vector unit and concurrently performing a second compute-and-move instruction in the second vector unit for computing a second vector operation on source operands from the second vector unit and placing the results of the second vector operation via a feedback connection into the first vector unit, wherein the first vector operation in the first vector unit is performed by the first compute-and-move instruction (vitadd) comprising the steps of executing a permutation of Viterbi state metrics through an indirect vector read operation from a plurality of first registers of the first vector unit under control of a vector pointer; adding Viterbi branch metrics to Viterbi state metrics; and moving the results to a vector accumulator register in the second vector unit.

8. The method according to claim 7, wherein each compute-and-move instruction performs an update of vector pointers to the first vector unit and the second vector unit of a vector pointer unit accessible to the first vector unit comprising generating through carry-wrap addition from a bitwise-rotated pointer (p) and an offset (q) an updated bitwise-rotated pointer (S) by wrapping around a carry-output from a output-bit of an enhanced adder selectable by a first index (m) to the carry-input of the enhanced adder's least significant bit and by suppressing carry propagation in a position selectable by a second index ($\alpha$).

9. A method for operating a first vector unit and a second vector unit in tandem, the method comprising performing a first compute-and-move instruction by performing a first vector operation on source operands from the first vector unit and placing the results of the first vector operation into the second vector unit and concurrently performing a second compute-and-move instruction in the second vector unit for computing a second vector operation on source operands from the second vector unit and placing the results of the second vector operation via a feedback connection into the first vector unit, wherein the second vector operation in the second vector unit is performed by the second compute-and-move instruction (vitsel-vitmax/vitmin) comprising the steps of executing an element-wise selection (maximum/minimum) of Viterbi survivor metrics from vectors of incremented Viterbi state metrics in a plurality of vector accumulator registers of the second vector unit;
   obtaining bit decisions corresponding to the element-wise selection of Viterbi survivor metrics; and
   executing an inverse permutation of the Viterbi survivor metrics through an indirect vector write operation under control of a vector pointer, wherein the Viterbi survivor metrics are moved to a plurality of first registers of the first vector unit via a feedback connection.

10. The method according to claim 9, further comprising recording the bit decisions corresponding to the element-wise selection of Viterbi survivor metrics in a shift register for a subsequent Viterbi traceback operation (vmshl).

11. A method for implementing in a programmable digital signal processing device a Viterbi algorithm comprising a plurality of add-compare-select operations (ACS) operating on a plurality of Viterbi state metrics, the method comprising the step of:
   performing in a first vector unit and a second vector unit concurrent metric addition and survivor metric selection operations, respectively, for executing at least one of the plurality of add-compare-select operations (ACS), wherein a first vector operation in the first vector unit is performed by a first compute-and-move instruction (vitadd) comprising executing a permutation of Viterbi state metrics through an indirect vector read operation from a plurality of first registers of the first vector unit under control of a vector pointer;
   adding Viterbi branch metrics to Viterbi state metrics; and
   moving the results to a vector accumulator register in the second vector unit.

12. The method according to claim 11, wherein each compute-and-move instruction performs an update of vector pointers to the first vector unit and the second vector unit of a vector pointer unit accessible to the first vector unit comprising generating through carry-wrap addition from a bitwise-rotated pointer (p) and an offset (q) an updated bitwise-rotated pointer (S) by wrapping around a carry-output from a output-bit of an enhanced adder selectable by a first index (m) to the carry-input of the enhanced adder's least significant bit and by suppressing carry propagation in a position selectable by a second index ($\alpha$).

13. A method for implementing in a programmable digital signal processing device a Viterbi algorithm comprising a plurality of add-compare-select operations (ACS) operating on a plurality of Viterbi state metrics, the method comprising the step of:

performing in a first vector unit and a second vector unit concurrent metric addition and survivor metric selection operations, respectively, for executing at least one of the plurality of add-compare-select operations (ACS), wherein a second vector operation in the second vector unit is performed by a second compute-and-move instruction (vitsel-vitmax/vitmin) comprising the steps of executing an element-wise selection (maximum/minimum) of Viterbi survivor metrics from vectors of incremented Viterbi state metrics in a plurality of vector accumulator registers of the second vector unit;

obtaining bit decisions corresponding to the element-wise selection of Viterbi survivor metrics; and executing an inverse permutation of the Viterbi survivor metrics through an indirect vector write operation under control of a vector pointer, wherein the Viterbi survivor metrics are moved to a plurality of first registers of the first vector unit via a feedback connection.

* * * * *